2,895,872
Patented July 21, 1959

2,895,872

AGRONOMICAL PRACTICE FOR THE CONTROL OF NEMATODES WITH 1,2,3-TRIBROMOPROPANE

Lloyd J. Meuli, Long Beach, Calif., assignor to The Dow Chemical Company, Midland, Mich., a corporation of Delaware No Drawing. Application January 11, 1957
Serial No. 633,527

12 Claims. (Cl. 167—39)

The present invention relates to the culture and protection of crops and is particularly concerned with a new agronomical practice and composition for stimulating plant growth and improving the growth and harvest of crop plants.

The introduction of synthetic organic chemicals into the soil has been employed for the protection of crops against attack by soil organisms and the stimulation of plant growth. However, the utilization of such a method has been most generally hampered by the relatively low efficiency of many suggested materials when employed in clay type soils. Others of the known materials have been restricted in use by their selectivity and consequent failure to accomplish a desirable result on more than a very few varieties of crop plants. Thus, an agronomical practice which would benefit a large variety of plants when raised on silt, sand or clay loam soils would be of a distinct advantage to the agriculturist.

It is an object of the present invention to provide a new and improved agronomical practice for the culture of crops. A further object is to provide an improved practice for benefiting a large variety of crops raised on sand, silt or clay loam soils. Another object is the provision of a method for the treatment of soil which will accomplish the stimulation of the growth of crops subsequently planted therein. An additional object is the provision of a practice for protecting the roots of plants from the attack of soil-dwelling nematodes including sugar beet nematodes. A further object is the provision of a novel composition adapted to be employed in the new practice for growing crops. Other objects will become apparent from the following specification and claims.

The new agronomical practice comprises treating soil or growth media with 1,2,3-tribromopropane to benefit plants grown in the treated soil. Such practice protects the plants from the ravages of soil-dwelling nematodes which attack their roots and improves the growth and harvest of crop plants. It has been further found that the treatment with 1,2,3-tribromopropane accomplishes changes in the soil which stimulate the growth and improve the growth characteristics of crops grown therein. Thus, for example, crops raised on treated soil have more luxuriant tops and roots and are of a greater total weight than those normally obtained from untreated soil.

1,2,3-tribromopropane is a mobile liquid boiling at 92.5° C. at 10 millimeters' pressure, somewhat soluble in many organic solvents and of low solubility in water and is adapted readily and conveniently to be distributed in soil or growth media. Further, when so employed the compound accomplishes a rapid control of nematodes such as root-knot nematodes and sugar beet nematodes, and induces soil changes which improve the growth characteristics of crops grown in the treated soil. It is among the advantages of the present invention that these desirable and beneficial results are obtained in sand, silt and clay type soils. It is a further advantage that the compound, while sufficiently persistent to accomplish the desired effect upon soil-dwelling nematodes or to achieve the changes in the soil which accomplish improved growth characteristics, dissipates in a reasonable period of time. Yet another advantage is that the propane compound permeates soil for a distance of several inches from the point of application, depending upon the temperature, moisture content, compactness, and physical consistency of the soil or growth medium.

The distribution of an effective dosage of 1,2,3-tribromopropane in soil or growth media is essential for the practice of the present invention. In general, good controls of nematodes are obtained when the compound is distributed in the soil in the amount of from 1.0 to 200 parts or more by weight per million parts by weight of the soil. Where improved growth characteristics of crops are concerned, these concentrations are preferred, although lower concentrations are sometimes effective. In field applications, the propane compound may be distributed in the soil at a dosage of from 1.0 to 200 or more pounds per acre and through such a cross-section of the soil as to provide for the presence therein of an effective concentration of the treating agent. In such applications, it is desirable that the compound be distributed to a depth of at least 2 inches and at a dosage of at least 0.5 pound per acre-inch of soil. In other applications, it may be preferred that the compound be distributed through that cross-section of the soil in which the roots of the plant are or will be found. When the treatment is carried out by injection or drilling technique to a depth of from 4 to 6 inches below the soil surface, it is preferred that the maximum distance between deposits be not materially in excess of 16 inches when the dosage is 50 pounds or more of toxicant per acre and not materially in excess of 8 inches when the dosage is 15 pounds per acre, such maximum distance between deposits being directly proportional to the dosage of 1,2,3-tribromopropane within the extremes recited.

In one embodiment of the invention, the treated soil is planted with the desired crop plant following the distribution of the propane compound in the soil. Where minimum dosages of the propane compound are distributed in soil, the treated soil may be immediately planted with the desired crop. Following the distribution of larger dosages of the propane compound, it is desirable that any planting operation not be carried out for a period of from several hours to several days, the exact period depending upon the concentration of the propane compound in the soil and the resistance of the species concerned to the compound. Where the compound is employed for the treatment of the soil adjacent to the root system of established plants having resistance to the propane compound and in side-dressing operations, the existing vegetation is not unfavorably effected by minimum effective concentrations of the propane compound temporarily present in the soil.

The method of the present invention may be carried out by distributing the unmodified 1,2,3-tribromopropane compound through the growth media as by impregnation. However the present method also embraces the employment of a liquid or dust composition containing the toxicant. In such usage, the propane compound may be modified with one or a plurality of additaments or soil treating or parasiticide adjuvants, including water or other liquid carriers, surface active dispersing agents and finely divided inert solids. Depending upon the concentration of toxicant such augmented compositions are adapted to be distributed in the soil, or employed as concentrates and subsequently diluted with additional inert carrier to produce the ultimate treating compositions. The required amount of the propane compound in the growth media conveniently may be supplied per acre treated in from 10 to 27,000 gallons or more of the liquid carrier or in from about 20 to 2,000 pounds or more of the solid carrier.

The exact concentration of the propane compound to be employed in compositions for the treatment of growth media may vary provided the required dosage of effective agent is supplied. The concentration of toxicant in organic solvent compositions employed to supply the desired dosage is generally from about 10 to 85 percent by weight. With aqueous compositions, the required dosage is generally supplied with compositions containing 0.1 to 50 percent by weight, although concentrations of 0.0001 percent by weight conveniently may be employed in irrigation treatments of soil. In dusts, the concentration of toxicant may be from 1 to 50 percent by weight, although concentrations as low as 0.1 percent by weight are sometimes employed. In compositions to be employed as concentrates, the toxicant oftentimes is present in a concentration of from 5 to 95 percent by weight.

Liquid compositions containing the desired amount of the propane compound may be prepared by dissolving the toxicant in an organic liquid such as acetone, toluene, methylene chloride, chlorobenzene and petroleum distillates or by dispersing the toxicant in water with the aid of a suitable surface-active dispersing agent such as an ionic or non-ionic emulsifying agent. The preferred organic solvent carriers are those which are adapted to accomplish the penetration and impregnation of the soil with the propane compound and are of such volatility that they evaporate from the soil and leave little permanent residue therein.

The aqueous compositions may contain one or more water-immiscible solvents for the propane compound. In such compositions, the carrier comprises an aqueous emulsion, i.e. a mixture of water-immiscible solvent, emulsifying agent and water. The choice of dispersing and emulsifying agent and the amount thereof employed is dictated by the nature of the composition type and by the ability of the agent to facilitate the dispersion of the propane compound in the aqueous carrier to produce the desired composition. The surface active dispersing agents are generally employed in the amount of from 1 to 20 percent by weight of the combined weights of the agent and tribromopropane in the composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

A preferred embodiment of the invention consists of a petroleum distillate solution of the propane compound. The petroleum distillates to be employed in such embodiment are carefully-cut portions boiling almost entirely under 400° F. at atmospheric pressure, having a flash point above about 80° F. and leaving very small residues on evaporation. These fumigant compositions are characterized by having excellent penetrating properties and by being of low fire hazard to the shipper and user.

In the preparation of dust compositions, the 1,2,3-tribromopropane is dispersed in and on a finely divided inert solid such as talc, chalk, gypsum and the like. In such operations, the carrier is mechanically ground with the compound or wet with a volatile organic solvent solution thereof. Similarly, dust compositions containing the compound may be prepared from various of the solid surface active dispersing agents, such as bentonite, fuller's earth, attapulgite and other clays. Depending upon the proportions of ingredients, these dust compositions may be employed as concentrates and subsequently diluted with additional solid surface active dispersing agent or with talc, chalk or gypsum and the like to obtain the desired amount of active ingredient in a composition adapted to be employed for the treatment of soil. Also, such concentrate dust compositions may be dispersed in water with or without the aid of a dispersing agent to form aqueous soil treating compositions.

In another preferred embodiment, the propane compound is dispersed on and in an exploded mica to produce compositions adapted particularly to be employed in operations where a gradual and prolonged release of the toxicant is desired. In preparing such compositions, a coarsely subdivided mica carrier is mixed or wet with the propane compound and the resulting product thereafter packaged in air-tight containers to prevent loss of toxicant by volatilization prior to use. In compositions employed to supply the desired dosage, suitable proportions of toxicant are from about ¼ to 2 times the weight of the mica carrier.

A further preferred embodiment of the present invention is a novel composition comprising soil in admixture with an effective concentration of 1,2,3-tribromopropane.

When operating in accordance with the present invention, the soil may be impregnated with propane compound or a composition containing the toxicant, in any convenient fashion, e.g. by simple mixing with the soil, by employing a liquid carrier to accomplish the penetration and impregnation, or by injection or drilling techniques whereby the toxicant is deposited beneath the surface of the soil. Where injection or drilling techniques are concerned, the soil may be blanketed to suppress the volatilization of the propane compound therefrom. In general, it is desirable that the distribution be carried out at a soil temperature of 45° F. or higher since the effectiveness of the propane compound may be somewhat reduced at lower temperatures.

In a preferred embodiment, the method of the present invention is carried out in soil having a moisture content of from about 40 to 100 percent of the moisture equivalent of the soil. When operating under such soil conditions, maximum improvements in crop yields and controls of nematodes are obtained. Thompson, L. M., in Soils and Soil Fertility, McGraw Book Co., Inc. (1952), defines the moisture equivalent of a soil as equal to the percentage of water retained by wet soil after being centrifuged at 1000 times gravity. This equivalent is about the same as the so-called field capacity which may be defined as the moisture condition of the soil when downward movement of water into the soil has virtually ceased. This moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In such procedure, the amount of water may be varied in accordance with the moisture content and the moisture equivalent or field capacity of the soil in order to obtain the desired depth of distribution of the toxicant at a soil moisture content equal to the moisture equivalent. In such method, the propane compound readily and conveniently may be distributed to a depth of from two to four feet to avoid reinfestation from deep-dwelling organisms.

The expressions "growth media" or "soil" are employed in the present specification and claims in their broadest sense to be inclusive of all conventional "soils," as defined in Webster's New International Dictionary, second edition, unabridged, published in 1937 by G. and C. Merriam Company, Springfield, Massachusetts. Thus, the terms refer to any solid substances or media in which vegetation may take root and grow, and are intended to include not only earth but compost, manure, muck, humus, and sand and the like adapted to support plant growth.

The following examples illustrate the invention but are not to be construed as limiting the same:

Example 1

1,2,3-tribromopropane (boiling at 92.5° C. at 10 millimeters pressure) is dissolved in acetone to produce a fumigant composition containing 500 grams of the propane compound per liter of ultimate mixture. This composition is employed for the treatment of a seed bed containing a sandy loam soil heavily infested with root-knot nematodes. At the time of treatment, the soil has a moisture content of about 10 percent. This moisture content is about 80 percent of the moisture equivalent or field capacity of the soil. The distribution is accomplished by injecting the fumigant solution into the soil in rows 12 inches apart, the injections being made at 4 inch intervals and at a depth of about 6 inches below the soil surface. The amount of a fumigant employed is sufficient to supply 50 pounds of 1,2,3-tribromopropane per acre. The latter dosage corresponds to a concentration of about 16 parts by weight of 1,2,3-tribromopropane per million parts by weight of soil. Following the distribution, the average temperature remains at about 62° F. for the period of the determination.

About 10 days after treatment, the soil is seeded with tomatoes, the seeded soil being that positioned approximately 6 inches from the loci of treatment. Untreated check plots are also planted with tomato seeds. During the growing period, there is observed no adverse effect upon the germination and growth of seedlings attributable to the presence of residual fumigant. About 5 weeks after seeding, the plants are lifted from the soil, the roots washed and the latter examined for gall formation attributable to nematode attack. The examination indicates that a substantially complete control of root-knot nematodes has been obtained in the treated soil. In the check plots the plants are found to be dwarfed and the roots covered with galls attributable to nematode attack.

Example 2

25 parts by weight of 1,2,3-tribromopropane, 65 parts of chlorobenzene and 10 parts of an alkylated aryl polyether alcohol (Triton X–100) are mechanically mixed together to prepare a fumigant composition in the form of an emulsifiable liquid.

In a similar manner, 90 parts by weight of 1,2,3-tribromopropane and 10 parts of a sorbitan monolaurate polyethylene derivative (Tween 20) are mixed together to prepare a concentrate composition in the form of a water dispersible liquid.

These compositions are adapted to be dispersed in water to prepare aqueous compositions which have very desirable wetting and penetrating properties. The latter compositions may be employed to treat soil and distribute the propane compound therein in effective concentrations.

Example 3

1,2,3-tribromopropane is dissolved in a petroleum hydrocarbon fraction boiling at from about 190° to 272° F. (standard thinner No. 250) to produce a fumigant composition containing 0.5 gram of the propane compound per liter of ultimate mixture. This composition is employed for the treatment of seed beds containing a heavy infestation of sugar beet nematodes. At the time of treatment, the seed beds have a moisture content of about 9 percent. This moisture content is about 80 percent of the moisture equivalent of the soil. In the treating operations, the toxicant mixture is injected into the soil in an amount sufficient to supply 5 grams of 1,2,3-tribromopropane per cubic foot of soil. The latter dosage corresponds to a concentration af about 120 parts by weight of the propane compound per million parts by weight of soil. Following the application, the average soil temperature remains at about 60° F.

About 7 days after treatment, the soil is planted with sugar beet seeds. Untreated check plots are also planted with sugar beet seeds. During the growing period, there is observed no adverse effect upon the germination and growth of seedlings attributable to the propane compound. Four weeks after planting, the plants are lifted from the soil, the roots washed and the latter examined in order to determine the presence or absence of nematode disease. The examination indicates that a complete control of sugar beet nematodes is obtained in the treated soil. In the check plots, the plants are found to be dwarfed and stunted from the attack of sugar beet nematodes.

Example 4

A fumigant composition having a flash point greater than 100° F. is prepared by mixing together 20 percent by volume of 1,2,3-tribromopropane and 80 percent of a petroleum fraction commonly known as Stoddard solvent. The latter solvent has a boiling range of from 325° to 400° F. and a flash point of about 116° F. This composition is employed for the treatment of one-half of a field containing a clay loam soil which is substantially free of root attacking nematodes. The treatment is carried out by drilling technique whereby the fumigant mixture is introduced at a depth of about 6 inches and in rows spaced 8 inches apart. The amount of composition employed is sufficient to supply 35 pounds of 1,2,3-dibromopropane per acre. At the time of treatment, the soil has a moisture content of approximately 60 percent of the moisture equivalent or field capacity.

Ten days after treatment, the entire field is planted with carrot seeds. Toward the end of the growing season, the foliage and tops of the carrots in the treated soil are observed to be more lush and bountiful than those in the untreated portion of the field. At harvest, the yield of carrots from the treated soil is found to be substantially greater than the yield from the untreated soil.

Example 5

The fumigant composition as described in Example 3 is employed for the treatment of a sandy loam soil which is heavily infested with root-knot nematodes. At the time of treatment, the soil has a moisture content of about 9 percent, the latter being about 80 percent of the moisture equivalent. In the treating operations, the fumigant composition is injected into the soil in an amount sufficient to supply 5 grams of 1,2,3-tribromopropane per cubic foot of soil. The latter dosage corresponds to a concentration of about 120 parts by weight of the propane compound per million parts by weight of soil. Following the application, the average soil temperature remains at about 62° F.

One week after treatment, the soil is planted with tomato seeds. Untreated check plots are also planted with tomato seeds. During the growing season, there is observed no adverse effect on the germination and growth of seedlings attributable to the propane compound. About five weeks after planting, the plants are lifted from the soil, the roots washed and the latter examined for gall formation attributable to nematode attack. The examination of the plants indicates that a complete control of nematodes has been obtained in the treated soil with heavy infestation in the check plots.

Example 6

90 parts by weight of 1,2,3-tribromopropane is mixed with 10 parts by weight of dimeric alkylated aryl polyether alcohol (Triton X–155) and the resulting composition thereafter dispersed in water to prepare a composition containing about 50 pounds of the propane compound per 200 gallons of ultimate mixture. The latter composition, while under agitation, is metered into irrigation water at the pump outlet at the rate of 1 gallon per 100 gallons of the irrigation water. The water is in a state of turbulent flow as it comes from the pump which provides for thorough mixing of the fumigant composition therein. About one acre inch of irrigation water per acre is applied to land which is heavily infested with root-knot nematodes to accomplish the wetting of the soil to a depth of about 8 inches. One week after treatment, the soil is planted with tomato seeds. Four weeks after the seeding, the roots of the resulting stand of tomato plants are examined and found to be substantially free of galls attributable to nematode attack.

*Example 7*

Acetone solutions containing 12.5, 6.0 and 3.0 grams of 1,2,3-tribromopropane per liter of solution were employed for the treatment of sandy loam soil heavily infested with root-knot nematodes. In such operations, the soil was placed in sealable containers and thereafter treated with the compositions at dosages of 25, 12.5 and 6 pounds of 1,2,3-tribromopropane, respectively, per acre foot of soil. At the time of treatment, the soil had a moisture content of about 7 percent, the latter being about 50 percent of the field capacity. In the treating operations, the distribution was accomplished by injection to give concentrations of 6.2, 3.2 and 1.5 parts, by weight of 1,2,3-tribromopropane per million parts by weight of soil. The containers of treated soil were then sealed and set aside for about one week. Following the latter period, the containers were unsealed, and the treated soil allowed to aerate for about one week and thereafter planted with tomato seeds. Untreated but similarly infested soil was also planted with tomato seeds to serve as a check. During the subsequent growing period there was observed no adverse effect upon the germination and growth of seedlings attributable to the presence of residual toxicant.

About four weeks after planting, the plants were lifted from the soil and the roots washed and examined for evidence of gall formation attributable to nematode attack. The percent control of nematodes at the various concentrations of the tribromopropane compound in the treated soil are set forth in the following table.

| Concentration of Tribromopropane Compound in the Treated Soil in Pounds per Acre Foot | Percent Control of Nematodes |
| --- | --- |
| 25.0 | 100 |
| 12.5 | 98 |
| 6.25 | 87 |

At the time of the observations, the plants in the checks were found to be covered with galls attributed to nematode attack.

*Example 8*

An acetone solution containing 100 grams of 1,2,3-tribromopropane per liter was diluted with water to obtain aqueous compositions containing 50, 25 and 12.5 parts by weight of 1,2,3-tribromopropane per million parts by weight ultimate mixture. These compositions were employed for the treatment of seed beds of sandy loam soil heavily infested with root-knot nematodes. In the treating operations, the compositions were applied to the seed beds as a drench and at a rate of 5.7 acre inches of aqueous composition per acre. After seven days soil samples were taken from the seed beds at a depth of 12 inches below the soil surface and the samples placed in containers and planted with tomato seeds. In a check operation, untreated but similarily infested soil was also planted to tomatoes. Four weeks after planting, the tomato plants were lifted from the soil and the roots washed and examined for evidence of galls attributable to nematode attack.

The examination showed that a substantially complete control of nematodes had been obtained in the soil at all of the treatment dosages with a heavy infestation of nematodes in the untreated checks.

I claim:

1. An agronomical practice for the control of nematodes which comprises impregnating soil with 1,2,3-tribromopropane as the sole active nematocidal ingredient in the amount of at least 1.0 part by weight per million parts by weight of soil and thereafter planting the treated soil.

2. An agronomical practice which comprises impregnating soil with a nematocidal amount of 1,2,3-tribromopropane as the sole active nematocidal ingredient.

3. In the practice of plant husbandry for the control of nematodes, the method which comprises impregnating soil with 1,2,3-tribromopropane as the sole active nematocidal ingredient in the amount of at least 1.0 part by weight per million parts by weight of soil.

4. A method claimed in claim 3 wherein the soil is impregnated with a composition comprising a petroleum distillate solution of 1,2,3-tribromopropane.

5. A method claimed in claim 3 wherein the soil at the time of treatment with the propane compound has a moisture content of from 40 to 100 percent of the moisture equivalent of said soil.

6. In the practice of agricultural economy for the control of soil-dwelling nematodes, the method which comprises impregnating field soil with a composition made up of 1,2,3-tribromopropane in intimate admixture with an inert soil treating adjuvant as a carrier therefor, the impregnation being carried out so as to provide at least 1.0 part by weight of propane compound per million parts by weight of soil.

7. An agronomical practice which comprises impregnating field soil for the control of soil-dwelling nematodes with 1,2,3-tribromopropane as the sole active nematocidal ingredient at a substantially uniform dosage of at least 1.0 pound per acre, the impregnation being carried out through such a cross section of the soil as to provide for the presence therein of at least 1.0 part by weight of the propane compound per million parts by weight of soil.

8. A composition for the control of soil-dwelling nematodes which comprises 1,2,3-tribromopropane as the sole active nematocidal ingredient in intimate admixture with an adjuvant selected from the group consisting of (A) inert finely divided solids, (B) emulsifying and dispersing agents, and (C) petroleum distillates, the amount of such adjuvants employed in the compositions being from 50 to 99 percent by weight for (A), from 1 to 20 percent by weight for (B), and from 15 to 90 percent by weight for (C).

9. A concentrate composition for the control of soil-dwelling nematodes comprising 1,2,3-tribromopropane as the sole active nematocidal ingredient in intimate admixture with an inert finely divided solid, said propane compound being present in an amount of from 1 to 50 percent by weight of the composition.

10. A concentrate composition for the control of soil-dwelling nematodes comprising 1,2,3-tribromopropane as the sole active nematocidal ingredient in intimate admixture with a surface active dispersing agent, said propane compound being present in an amount of from 80 to 99 percent by weight of the composition.

11. A concentrate composition for the control of soil-dwelling nematodes comprising 1,2,3-tribromopropane as the sole active nematocidal ingredient in intimate admixture with a petroleum distillate, said propane compound being present in an amount of from 10 to 85 percent by weight of the composition.

12. An aqueous dispersion of the composition of claim 10, said propane compound being present in an amount of at least 0.0001 percent by weight of the composition.

References Cited in the file of this patent

UNITED STATES PATENTS

| 2,421,507 | Jones | June 3, 1947 |
| 2,435,204 | Davidson | Feb. 3, 1948 |
| 2,636,815 | Molnar | Apr. 28, 1953 |

(Other references on following page)

FOREIGN PATENTS 124,387   Australia _____ June 12, 1947

OTHER REFERENCES

King: U.S. Dept. of Agri. Bull. No. 69, Agri. Res. Service, 1954, p. 278.

Ichikawa, in "Phytopathology," vol. 45, No. 10, October 1955, p. 576.

Frear: "Catalogue of Insecticides and Fungicides," vol. 1, 1947, p. 161.